(12) United States Patent
Shen et al.

(10) Patent No.: US 12,596,050 B2
(45) Date of Patent: Apr. 7, 2026

(54) DEVICE AND METHOD FOR LEAKAGE DETECTING OF CRUDE OIL TANK FLOOR

(71) Applicant: CHINA SPECIAL EQUIPMENT INSPECTION AND RESEARCH INSTITUTE, Beijing (CN)

(72) Inventors: Gongtian Shen, Beijing (CN); Baoxuan Wang, Beijing (CN); Yongna Shen, Beijing (CN); Bin Hu, Beijing (CN)

(73) Assignee: CHINA SPECIAL EQUIPMENT INSPECTION AND RESEARCH INSTITUTE, Beijing (CN)

( * ) Notice: Subject to any disclaimer, the term of this patent is extended or adjusted under 35 U.S.C. 154(b) by 294 days.

(21) Appl. No.: 18/376,567

(22) Filed: Oct. 4, 2023

(65) Prior Publication Data

US 2024/0272031 A1 Aug. 15, 2024

(30) Foreign Application Priority Data

Feb. 14, 2023 (CN) .......................... 202310110325.4

(51) Int. Cl.
*G01M 3/24* (2006.01)

(52) U.S. Cl.
CPC ..................................... *G01M 3/24* (2013.01)

(58) Field of Classification Search
None
See application file for complete search history.

(56) References Cited

U.S. PATENT DOCUMENTS

| | | | | |
|---|---|---|---|---|
| 2,961,869 A | * | 11/1960 | Bagno ..................... | G01M 3/10 73/49.3 |
| 4,660,679 A | * | 4/1987 | Ostrobrod ............... | B66C 5/025 116/202 |
| 6,104,970 A | * | 8/2000 | Schmidt, Jr. ........... | B62D 55/32 73/1.22 |
| 10,012,561 B2 | * | 7/2018 | Walker .................. | G01N 29/043 |
| 10,067,096 B2 | * | 9/2018 | Fedosovsky ......... | G01N 27/902 |
| 10,508,968 B1 | * | 12/2019 | Vaganay ............... | B65D 90/50 |
| 11,181,438 B2 | * | 11/2021 | Meyers ............... | G01M 5/0075 |
| 11,828,731 B2 | * | 11/2023 | Meyers ............... | G01N 29/265 |
| 2008/0148876 A1 | * | 6/2008 | Hock ................... | G01N 29/225 73/865.8 |
| 2019/0325668 A1 | * | 10/2019 | Cole .................... | G05D 1/0692 |
| 2023/0003687 A1 | * | 1/2023 | Vaganay ................ | G01M 3/40 |

* cited by examiner

*Primary Examiner* — Mark A Shabman
(74) *Attorney, Agent, or Firm* — Cozen O'Connor

(57) ABSTRACT

A device and method for leakage detecting of a crude oil tank floor are provided. The device comprises a control system, a detection robot and a plurality of acoustic signal receivers. The acoustic signal receivers and the control system are all arranged outside a crude oil tank. The acoustic signal receivers are all connected with the control system. When the crude oil tank is detected, the detection robot is arranged in the crude oil tank. The detection robot comprises a moving mechanism, a positioning sonar and an array leakage detection sensor. The positioning sonar and the array leakage detection sensor are both arranged on the moving mechanism. The acoustic signal receivers are used for receiving sonar signals sent by the positioning sonar. The array leakage detection sensor is used for detecting a leakage point of the crude oil tank.

12 Claims, 4 Drawing Sheets

1

DEVICE AND METHOD FOR LEAKAGE DETECTING OF CRUDE OIL TANK FLOOR

CROSS-REFERENCE TO RELATED APPLICATION

This patent disclosure claims the benefit and priority of Chinese Patent Application No. 202310110325.4 filed with the China National Intellectual Property Administration on Feb. 14, 2023, the disclosure of which is incorporated by reference herein in its entirety as part of the present disclosure.

TECHNICAL FIELD

The present disclosure relates to the leakage detection field of oil tank floor, in particular to a device and method for leakage detecting of crude oil tank floor.

BACKGROUND

With continuous increase of oil reserves in China, crude oil tanks are also developing rapidly in large scale. The large metal storage tanks are important equipment commonly used for storage of oil products or chemical raw materials. Most of the oil products or chemical raw materials are flammable, explosive and corrosive. Due to influence by silt, water, air and other factors all the year round, the floor of the storage tank is easily corroded, and is the main area for storage tank detection and maintenance. In severe cases, leakage of the floor of the storage tank is caused. Once a leakage accident occurs, the life safety of the masses is seriously threatened, and great economic losses are usually caused. Traditionally, the detection manners through manually opening the tank for accessing the interior of the tank are adopted, but there are some disadvantages of inspectors being exposed to dangers, a high intensity, a high cost and a long cycle. At present, with a more advanced method, a robot equipped with detection devices enters into a tank to detect leakages of the floor. An on-line detection device for the floor of storage tanks is available. The device includes a detection robot equipped with various types of corrosion degree detectors. The detection robot is released to the floor of the storage tank from an opening in the top of the tank through a releasing and retracting device. After the detection robot enters into the tank, autonomous planning or remote control of the detection robot is performed to determine and adjust a walking posture, method and speed, so that the detection robot can detect corrosion under a state of walking on the floor of the storage tank. At the same time, a positioning device ensures that the detection robot is positioned in real time during the detection process and the specific position of the detection robot is accurately identified when the releasing and retracting device is used for retracting. The on-line detection device for a floor of a storage tank can detect metal loss, crack and other defects of the floor of the storage tank without suspending production, and accurately position positions of the defects. And there is also an acoustic emission detection technology for detecting a leakage position of a floor of a storage tank. Firstly, crude oil in a leaking tank is poured into another tank with no leaking, and then eight sensors are arranged on the circumference of an outer surface of a wall of the leaking tank. The position of a leakage point of the floor of the storage tank can be detected by acoustic source positioning. The existing on-line detection device for tank floors mainly has disadvantages that the device can only detect corrosion and crack defects, the point-to-point detection by robot equipped with the sensors according to planned routes is low in detection efficiency. In addition, in an existing acoustic emission detection technology for detecting a leakage position of the floor of the storage tank, a detection sensor is placed outside the storage tank, leakage signals are extremely weak and cannot be detected, and crude oil of the tank needs to be poured before the detection of the storage tank, which is time-consuming, resulting in that on-line detection cannot be realized.

SUMMARY

The present disclosure aims to provide a device and method for leakage detecting of a crude oil tank floor, and can solve the problem that leakage signals of a floor inside a large crude oil tank are weak and cannot be received by sensors outside the tank.

In order to achieve the purpose, the present disclosure provides the following scheme.

A device for leakage detecting of a crude oil tank floor includes a control system, a detection robot and a plurality of acoustic signal receivers.

The plurality of acoustic signal receivers are all arranged outside a crude oil tank. The control system is arranged outside the crude oil tank. The plurality of acoustic signal receivers are all connected with the control system. When the crude oil tank is detected, the detection robot is arranged in the crude oil tank.

The detection robot includes a moving mechanism, a positioning sonar and an array leakage detection sensor. The positioning sonar and the array leakage detection sensor are both arranged on the moving mechanism. The plurality of acoustic signal receivers are used for receiving a sonar signal sent by the positioning sonar. The array leakage detection sensor is used for detecting a leakage point of the crude oil tank.

In some embodiments, the plurality of acoustic signal receivers are all arranged outside the floor of the crude oil tank.

In some embodiments, a number of the plurality of acoustic signal receivers is at least four.

In some embodiments, the device further includes a releasing and retracting device. The releasing and retracting device is used for releasing or retracting the detection robot.

In some embodiments, the releasing and retracting device includes a tripod and a steel wire rope connected with the tripod. The tripod is arranged on the crude oil tank. The steel wire rope is connected with the detection robot.

In some embodiments, the array leakage detection sensor includes a 360-degree rotating platform and a plurality of ultrasonic sensors. The plurality of ultrasonic sensors are all arranged on the 360-degree rotating platform.

In some embodiments, orientations of the plurality of ultrasonic sensors are the same.

The present disclosure also provides a method for leakage detecting of a crude oil tank floor. The method is applied to any of the devices mentioned above. The method includes the following steps:

acquiring sonar signals received by the plurality of acoustic signal receivers and leakage signals from an array leakage detection sensor;

controlling movement of a detection robot and marking coordinates of the detection robot according to the sonar signal; and determining a position of a leakage point according to the leakage signal and the coordinates of the detection robot.

According to the specific embodiments provided by the present disclosure, the present disclosure has the following technical effects.

The plurality of acoustic signal receivers according to the present disclosure are all arranged outside a crude oil tank. The control system is arranged outside the crude oil tank. The plurality of acoustic signal receivers are all connected with the control system. When the crude oil tank is detected, the detection robot is arranged in the crude oil tank. The detection robot includes a moving mechanism, a positioning sonar and an array leakage detection sensor. The positioning sonar and the array leakage detection sensor are both arranged on the moving mechanism. The plurality of acoustic signal receivers are used for receiving sonar signals sent by the positioning sonar. The array leakage detection sensor is used for detecting a leakage point of the crude oil tank. The present disclosure can solve the problem that a signal of a floor leakage inside a large crude oil tank is weak and cannot be received by a sensor outside the tank.

BRIEF DESCRIPTION OF THE DRAWINGS

To more clearly illustrate the present embodiment of the present disclosure or the technical scheme in the prior art, the following briefly introduces the attached figures to be used in the present embodiment. Apparently, the attached figures in the following description show merely some embodiments of the present disclosure, and those skilled in the art may still derive other drawings from these attached figures without creative efforts.

REFERENCE SIGNS 1, tripod; 2, acoustic signal receiver; 3, array leakage detection sensor; 4, positioning sonar; 5, detection robot; 6, leakage point; 7, control system; 8, ultrasonic sensor; and 9, 360-degree rotating platform.

DETAILED DESCRIPTION OF THE EMBODIMENTS

The technical scheme in the embodiments of the present disclosure will be clearly and completely described based on drawings of the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

Some embodiments of the present disclosure aims to provide a device and method for leakage detecting of a crude oil tank floor, and can solve the problem that a leakage signal of a floor inside a large crude oil tank is weak and cannot be received by a sensor outside the tank.

To make the foregoing objective, features and advantages of the present disclosure clearer and more comprehensible, the present disclosure is further described in detail below with reference to the attached figures and specific embodiments.

Figure 1:
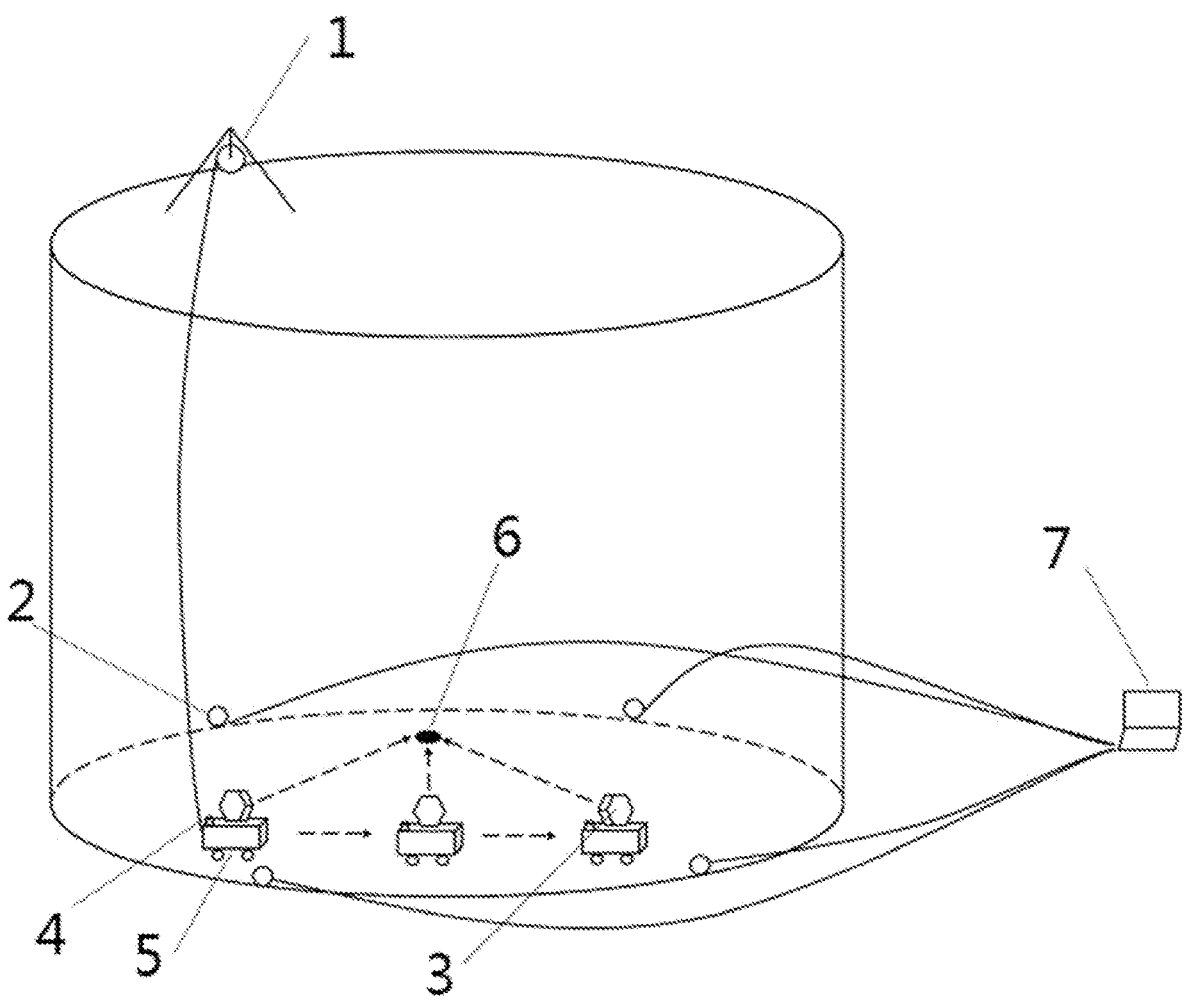
FIG. 1 is a schematic diagram of a device for leakage detecting of a crude oil tank floor provided by the present disclosure.

As shown in FIG. 1, a device for leakage detecting of a crude oil tank floor provided by the present disclosure includes a control system 7, a detection robot 5 and a plurality of acoustic signal receivers 2.

The plurality of acoustic signal receivers 2 are all arranged outside a crude oil tank. The control system 7 is arranged outside the crude oil tank. The plurality of acoustic signal receivers 2 are all connected with the control system 7. When the crude oil tank is detected, the detection robot 5 is arranged in the crude oil tank. The control system 7 is used for controlling an action state of a moving mechanism by an operator and carrying out path planning. The acoustic signal receivers 2 are used for receiving signals sent by a positioning sonar 4 to position the moving mechanism and sending coordinate position data to the control system 7. Specifically, the acoustic signal receivers are used for receiving an acoustic signal in a specific frequency band emitted by a sonar placed above the detection robot 5, and the positioning of the detection robot 5 of the tank can be realized by a calculation method of time difference of arrival.

The detection robot 5 includes a moving mechanism, a positioning sonar 4 and an array leakage detection sensor 3. The positioning sonar 4 and the array leakage detection sensor 3 are both arranged on the moving mechanism. The acoustic signal receivers 2 are used for receiving sonar signals sent by the positioning sonar 4. The array leakage detection sensor 3 is used for detecting a leakage point 6 of the crude oil tank to realize orientation identification for micro leakage. The positioning sonar 4 is used for transmitting acoustic waves required for positioning the moving mechanism.

The plurality of acoustic signal receivers 2 are all arranged outside the floor of the crude oil tank. A number of the acoustic signal receivers 2 is at least four.

The device for detecting a leakage of a crude oil tank floor also includes a releasing and retracting device. The releasing and retracting device is used for releasing or retracting the detection robot 5. The releasing and retracting device includes a tripod 1 and a steel wire rope connected with the tripod 1. The tripod 1 is arranged on the crude oil tank. The steel wire rope is connected with the detection robot 5.

Figure 3:
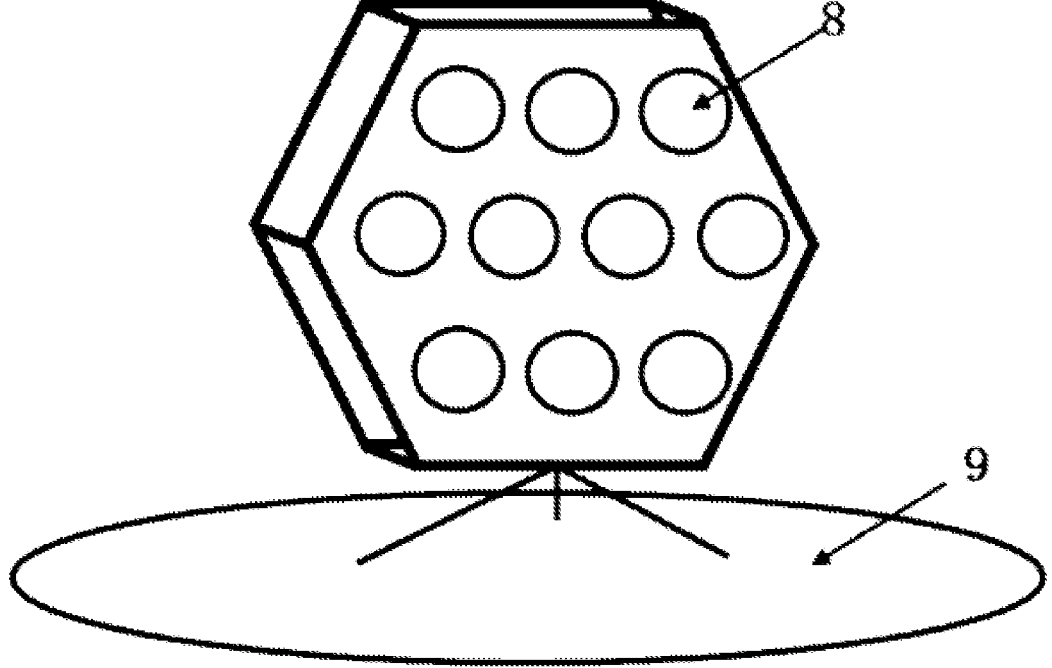
FIG. 3 is a schematic diagram of an array leak detection sensor.

As shown in FIG. 3, the array leakage detection sensor 3 includes a 360-degree rotating platform 9 and a plurality of ultrasonic sensors 8. The plurality of ultrasonic sensors 8 are all arranged on the 360-degree rotating platform 9, and can realize all-round scanning. The orientations of the plurality of ultrasonic sensors 8 are the same.

Figure 2:
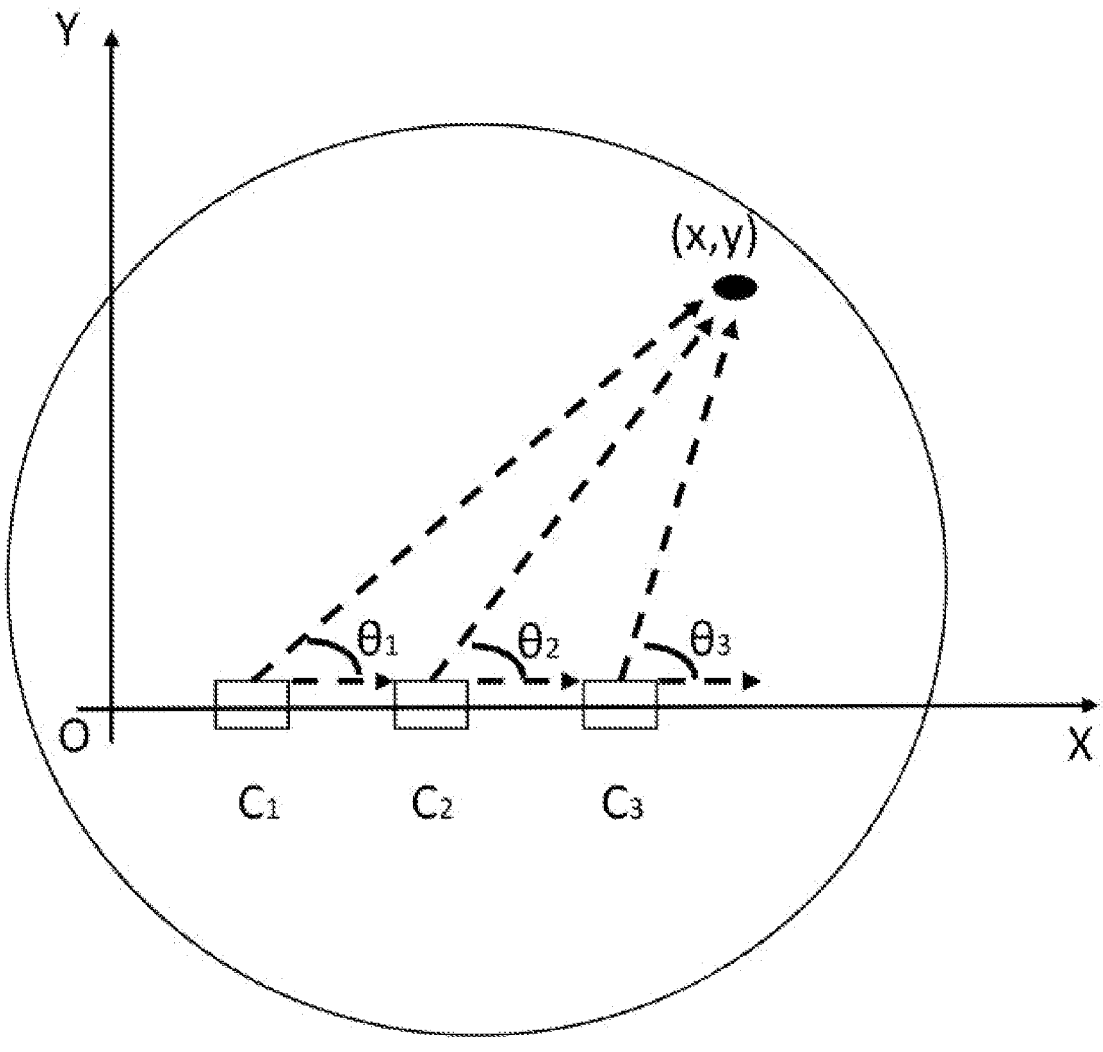
FIG. 2 is a schematic diagram of a positioning principle of a leakage point.

The acoustic signal receivers are distributed around an outer wall of the floor of the storage tank. Through a lifting tripod 1, the detection robot 5 for the floor of the storage tank is placed on the floor of the storage tank from a tank roof opening, which is recorded as an origin O of a coordinate system, as shown in FIG. 2. The array leakage detection sensor 3 and the positioning sonar 4 are equipped on the detection robot 5.

Specifically, the detection robot 5 is a magnetic adsorption wheeled robot. The array leakage detection sensor 3 is an ultrasonic sensor array. The rotation of the ultrasonic sensor array is controlled by the 360-degree rotating platform 9, so that leakage detection at any angle ranged from 0 to 360 degree can be realized.

The present disclosure also provides a method for leakage detecting of a crude oil tank floor. The method is applied to the device for leakage detecting of a crude oil tank floor. The method includes the following steps:

acquiring sonar signals received by acoustic signal receivers and leakage signals from an array leakage detection sensor;

controlling movement of a detection robot and marking coordinates of the detection robot according to the sonar signal; and determining a position of a leakage point according to the leakage signal and the coordinates of the detection robot.

Figure 4:
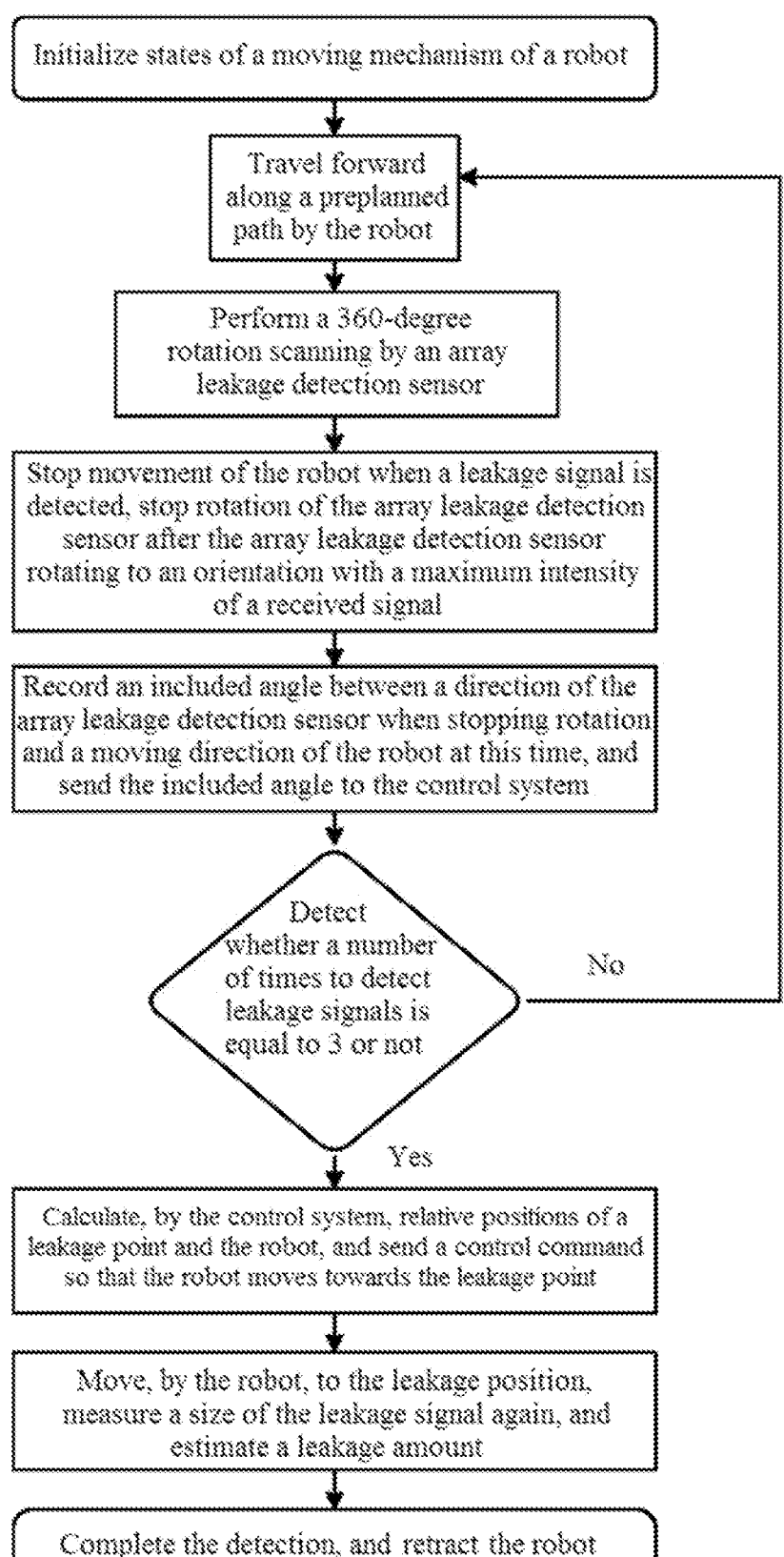
FIG. 4 is a schematic diagram of a method for leakage detecting of a crude oil tank floor.

In step one, an initial state position of a moving mechanism is determined, as shown in FIG. 4, and a coordinate system is established based on this position, where the position is recorded as a coordinate origin o. Specifically, a detection robot is placed on the floor of the storage tank, and states of the detection robot is initialized, including: selecting an ultrasonic detection sensor array to measure an environmental threshold, initializing an orientation angle, determining the sending of a sonar signal at a current position of the detection robot, initializing the orientation of the detection robot, planning a detection path of the detection robot by a control system, and marking the current position of the detection robot as the origin O of the coordinate system, thereby completing the initialization.

In step two, the moving mechanism travels forward along the positive direction of an x axis. Acoustic signals generated by liquid leakage have different spectrum characteristics with that of environmental noise. Environmental noise interference is eliminated by filtering in a specific frequency band, and leakage signals are collected. And a coordinate position $C_i$ corresponding to the moving mechanism at each collection point and a corresponding leakage azimuth angle $\theta_i$ (i being 1, 2, 3, 4, . . . ) are recorded. The robot travels forward along a preplanned path for a certain distance, and the array leakage detection sensor performs 360-degree rotation scanning. Upon detecting the leakage signal by the ultrasonic detection sensor array, the detection robot stops moving, and this stop point is recorded as $(0, C_1)$. An included angle between the alignment direction of the ultrasonic detection sensor array and the orientation of the detection robot is defined as a leakage azimuth angle, which is recorded as $\theta_1$. The two data are recorded and sent to the control system.

In step three, the step two is repeated until the number of data detecting times is greater than or equal to three, and then the robot stops moving and sends a collected data group to the control system. If the number of data detecting times does not reach three times, the robot continues traveling along the preplanned path.

In step four, based on above data acquisition, it is known that the leakage point X (x, y) is located on a straight line $y=\tan\theta_i(x-C_i)$, that is, $\tan\theta_i*x-y=\tan\theta_i*C_i$, and an equation set of multiple groups of measurement data is established:

$$\begin{cases} \tan\theta_1*x_1-y_1=\tan\theta_1*C_1 \\ \tan\theta_2*x_2-y_2=\tan\theta_2*C_2 \\ \quad\quad\vdots \\ \tan\theta_n*x_n-y_n=\tan\theta_n*C_n \end{cases}.$$

The matrix representation of the equation is as follows:

$$AX=B.$$

Where, A and B are coordinate calculation matrices.

$$A=\begin{bmatrix} \tan\theta_1, & -1 \\ \tan\theta_2, & -1 \\ \vdots \\ \tan\theta_n, & -1 \end{bmatrix}, B=\begin{bmatrix} \tan\theta_1*C_1 \\ \tan\theta_2*C_2 \\ \vdots \\ \tan\theta_n*C_n \end{bmatrix}.$$

The least square solution of the leakage point can be obtained:

$$X=(A^TA)^{-1}A^TB.$$

When the number of data detecting times is three, the control system calculates the coordinate position of the leakage point according to the following equation set, the least square solution of the leakage position is expressed as:

$$X=(A^TA)^{-1}A^TB.$$

Where, $$A=\begin{bmatrix} \tan\theta_1, & -1 \\ \tan\theta_2, & -1 \\ \tan\theta_3, & -1 \end{bmatrix}, B=\begin{bmatrix} \tan\theta_1*C_1 \\ \tan\theta_2*C_2 \\ \tan\theta_3*C_3 \end{bmatrix}.$$

The leakage position is measured according to the above steps. According to the position calculated by the above equations, the control system plans the path of the detection robot again, sends a control command so that the robot moves to the leakage point along the planned path. The robot measures a size of the leakage signal again after the robot moves to the leakage point, and estimates leakage amount to complete detection. Then, the robot is retracted.

The method is used for leakage detection of a large crude oil tank floor under the condition that oil is not unloaded and the tank is not opened. The moving mechanism is equipped with the array leakage detection sensor and the positioning sonar to move along a known path, and 360-degree circumferential scanning is carried out at a known position by the array leakage sensor. Whether there is leakage or not is determined through frequency analysis of the collected acoustic signals, and sensor orientation is determined when the signal is the strongest. According to directional results of leakage signals at three or more points, the position of the leakage point is determined. Further approaching detection is carried out to determine the position of the leakage point and the leakage intensity. The array leakage detection sensor is provided with narrow band ultrasonic probes, which are arranged in a certain form and are uniform in orientations. When the sensor directly faces a leakage source, the signal amplitude is the largest, and then the direction of the leakage source is determined. The positioning sonar carried in the moving mechanism continuously transmits pulse signals, and the acoustic signal receivers receive the sonar signal and determine the orientation of the robot by time difference positioning. The detection method with oil loaded in the tank solves the problem that a signal of a floor leakage inside a large crude oil tank is weak and cannot be received by a sensor outside the tank. Through moving along the known path and, 360-degree large-scale scanning to initially position the leakage source and then performing an approaching detection, the detection efficiency of a large-area floor can be improved. An moving device applied when the tank is loaded with oil is equipped with the array leakage sensor and the positioning sonar, so that the purpose of detecting the leakage of the floor under the condition that oil is not unloaded and the tank is not opened can be achieved. The array leakage detection sensor configured by an ultrasonic probe array is directional, and the signal intensity is the highest when the array leakage detection sensor directly faces an acoustic source. When performing 360-degree scanning at a known position, the direction of the acoustic source is determined according to the signal intensity. Through the scanning results of three or more known positions, the position of the acoustic source can be determined.

All embodiments in this specification are described in a progressive manner. Each embodiment focuses on differences from other embodiments. For the part that is the same or similar between different embodiments, reference may be made between the embodiments.

Several examples are used for illustration of the principles and implementation methods of the present disclosure. The description of the embodiments is used to help illustrate the device and the core principles of the present disclosure; and meanwhile, those skilled in the art can make various modifications in terms of specific embodiments and scope of application in accordance with the teachings of the present disclosure. In summary, the contents of this specification should not be understood as the limitation of the present disclosure.

What is claimed is:

1. A device for leakage detecting of a crude oil tank floor, comprising a control system, a detection robot and a plurality of acoustic signal receivers, wherein the plurality of acoustic signal receivers are all configured to be outside a crude oil tank during the leakage detecting; the control system is configured to be outside the crude oil tank during the leakage detecting; the plurality of acoustic signal receivers are all connected with the control system; the detection robot is configured to be in the crude oil tank during the leakage detecting;

the detection robot comprises a moving mechanism, a positioning sonar and an array leakage detection sensor; the positioning sonar and the array leakage detection sensor are both arranged on the moving mechanism; the plurality of acoustic signal receivers are used for receiving sonar signals sent by the positioning sonar; the array leakage detection sensor comprises a 360-degree rotating platform and a plurality of ultrasonic sensors; and the plurality of ultrasonic sensors are all arranged on the 360-degree rotating platform, and the array leakage detection sensor is used for detecting a leakage point of the crude oil tank;

the control system is configured for:

receiving the sonar signals from the plurality of acoustic signal receivers and a leakage signal from the array leakage detection sensor;

determining an alignment direction of the array leakage detection sensor upon detecting the leakage signal according to the leakage signal, and coordinates and an orientation of the detection robot upon detecting the leakage signal according to the sonar signals, thereby obtaining a data set comprising the alignment direction of the array leakage detection sensor and coordinates and an orientation of the detection robot;

controlling the detection robot to move such that the array leakage detection sensor detects at least three leakage signals, thereby obtaining at least three data sets; and determining a position of the leakage point according to the at least three data sets.

2. The device according to claim 1, wherein the plurality of acoustic signal receivers are all arranged outside the floor of the crude oil tank.

3. The device according to claim 1, wherein a number of the plurality of acoustic signal receivers is at least four.

4. The device according to claim 1, further comprising a releasing and retracting device, wherein the releasing and retracting device is configured to release or retracting the detection robot.

5. The device according to claim 4, wherein the releasing and retracting device comprises a tripod and a steel wire rope connected with the tripod; the tripod is configured to be on the crude oil tank during the leakage detecting; and the steel wire rope is connected with the detection robot.

6. The device according to claim 1, wherein orientations of the plurality of ultrasonic sensors are the same.

7. A method for leakage detecting of a crude oil tank floor, wherein the method is implemented by a device for leakage detecting of a crude oil tank floor, the device comprises a control system, a detection robot and a plurality of acoustic signal receivers, the plurality of acoustic signal receivers are all configured to be outside a crude oil tank during the leakage detecting; the control system is configured to be outside the crude oil tank during the leakage detecting; the plurality of acoustic signal receivers are all connected with the control system; the detection robot is configured to be in the crude oil tank during the leakage detecting;

the detection robot comprises a moving mechanism, a positioning sonar and an array leakage detection sensor; the positioning sonar and the array leakage detection sensor are both arranged on the moving mechanism; the plurality of acoustic signal receivers are used for receiving sonar signals sent by the positioning sonar; the array leakage detection sensor comprises a 360-degree rotating platform and a plurality of ultrasonic sensors; and the plurality of ultrasonic sensors are all arranged on the 360-degree rotating platform, and the array leakage detection sensor is used for detecting a leakage point of the crude oil tank;

the method comprises following steps:

acquiring the sonar signals received by the plurality of acoustic signal receivers and a leakage signals and an alignment direction of the array leakage detection sensor upon detecting the leakage signal from the array leakage detection sensor;

determining an alignment direction of the array leakage detection sensor upon detecting the leakage signal according to the leakage signal, and coordinates and an orientation of the detection robot upon detecting the leakage signal according to the sonar signals, thereby obtaining a data set comprising the alignment direction of the array leakage detection sensor and coordinates and an orientation of the detection robot;

controlling the detection robot to move such that the array leakage detection sensor detects at least three leakage signals, thereby obtaining at least three data sets; and determining a position of the leakage point according to according to the at least three data sets.

8. The method according to claim 7, wherein the plurality of acoustic signal receivers are all arranged outside the floor of the crude oil tank.

9. The method according to claim 7, wherein a number of the plurality of acoustic signal receivers is at least four.

10. The method according to claim 7, wherein the device further comprises a releasing and retracting device, the releasing and retracting device is configured to release or retract the detection robot.

11. The method according to claim 10, wherein the releasing and retracting device comprises a tripod and a steel wire rope connected with the tripod; the tripod is configured to be on the crude oil tank during the leakage detecting; and the steel wire rope is connected with the detection robot.

12. The method according to claim 7, wherein orientations of the plurality of ultrasonic sensors are the same.

\*   \*   \*   \*   \*